April 29, 1958 G. SCHWANK 2,832,331
RADIANT HEATER AND BROILER
Filed Feb. 17, 1955 3 Sheets-Sheet 1
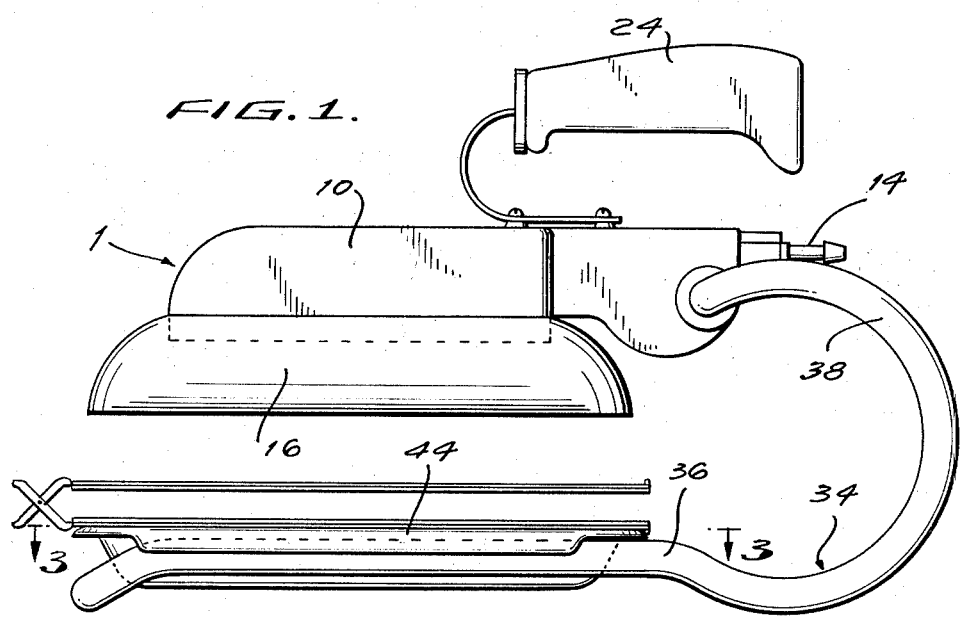
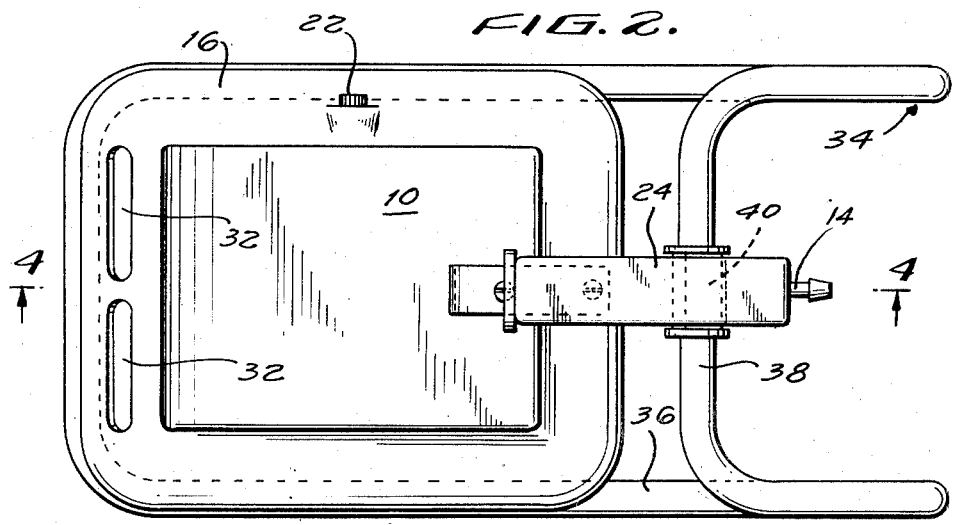
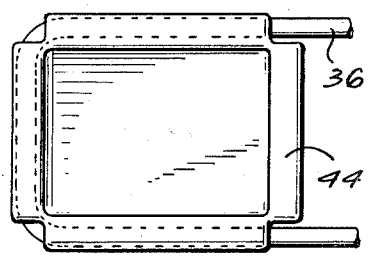

April 29, 1958 G. SCHWANK 2,832,331
RADIANT HEATER AND BROILER
Filed Feb. 17, 1955 3 Sheets-Sheet 3

United States Patent Office 2,832,331
Patented Apr. 29, 1958

2,832,331

RADIANT HEATER AND BROILER

Gunther Schwank, Koln-Kalk, Germany; Rheinisch-Westfolische "Resision" Treuhand Aktiengesellschaft (Treuhand Aktiengesellschaft) and Wilhelm Franken, executors of said Gunther Schwank, deceased, assignors to American Infra Red Radiant Co., Inc., New York, N. Y., a corporation of Delaware Application February 17, 1955, Serial No. 488,819

2 Claims. (Cl. 126—92)

The present invention relates to radiant heaters and broilers, and more particularly, although not exclusively, to a radiant heater and broiler in which there is incorporated a radiation burner in accordance with my co-pending application Serial Number 214,468 filed March 8, 1951 now Patent No. 2,775,294, granted Dec. 25, 1956.

The main object of the present invention is to provide a radiant heater capable of a plurality of different uses. The radiant heaters according to the present invention may be used as room heaters, as broilers, as hot plates, or as portable hand tools for stripping paint and the like. A single heater according to the present invention is capable of performing all of these functions.

Although the radiant heater and broiler of the present invention is described in connection with the particular form of radiant gas burner to which my co-pending application relates, it is to be understood that the present invention is not limited thereto, and that it includes within its scope any other type of radiation burner for gaseous fuel, or even the use of an electric radiating element.

In its more general form, the radiant heater and broiler of the present invention comprises a heating element which defines a uniform radiating surface. This element is positioned in a housing with its radiating surface exposed. When the heater is designed as a gas heater, the housing defines a mixing chamber for gas and air which are fed from the inside of the housing to the radiating surface. The housing is provided with suitable means for connecting it to a stand in order to support the radiant heater in any one of a number of desired positions, for example with the radiating surface directed downwardly for broiling, upwardly for cooking, and in a substantially horizontal direction for space heating. The housing is also provided with a handle whereby the heater can be held and moved in any desired manner, for example to heat a surface for baking newly applied paint or for burning off and stripping paint as desired.

The invention will now be described in detail with reference to the accompanying drawings illustrating two embodiments thereof. In the drawings:

Figure 1 is a side elevation of a first embodiment of the invention;

Figure 2 is a top plan view of the heater of Figure 1;

Figure 3 is a view from above along the line 3—3 of Figure 1;

Figure 4:
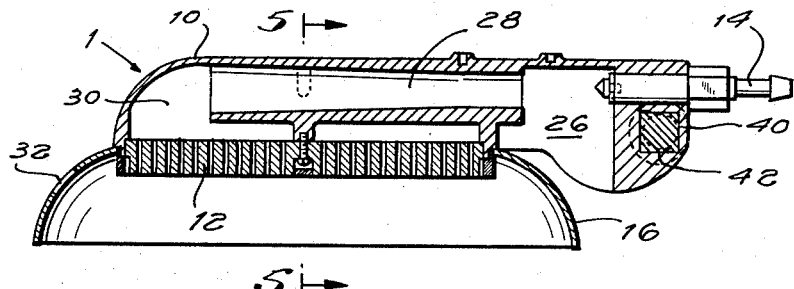
Figure 5:
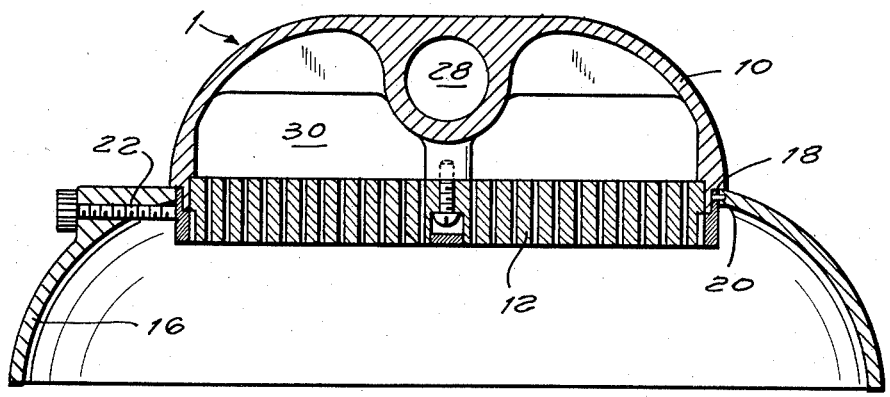
Figure 8:
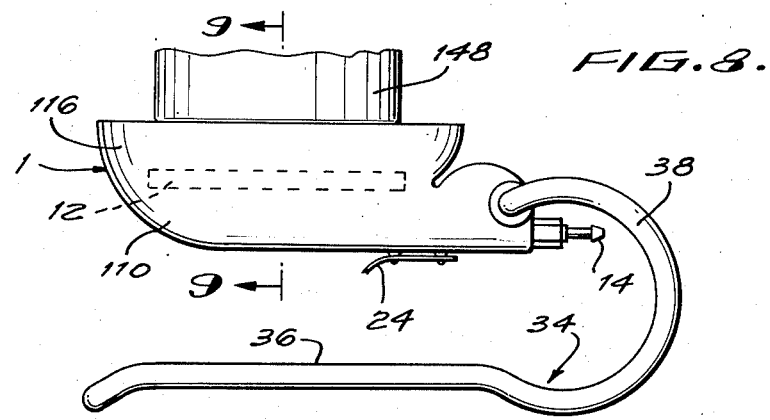
Figure 9:
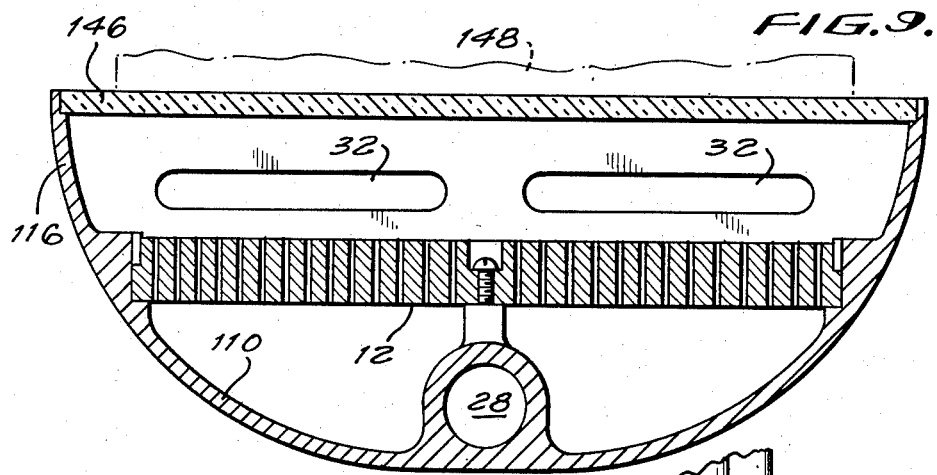
Figures 6, 7:
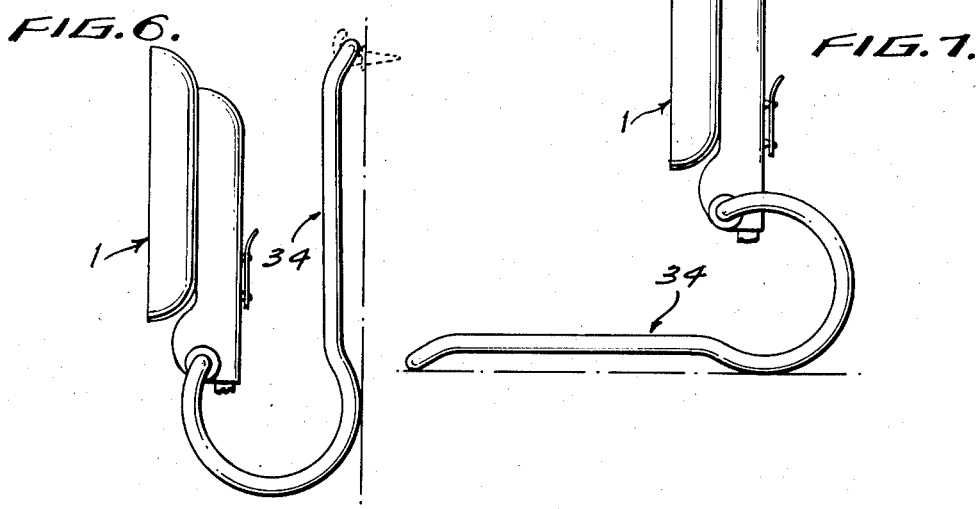

Figures 4 and 5 are sections taken respectively on line 4—4 on Figure 2 and on line 5—5 of Figure 4;

Figures 6 and 7 are views in side elevation of the heater of Figure 1 when in two other positions; and Figures 8 and 9 are respectively a side elevation and a section on line 9—9 on Figure 8 of a second embodiment of the invention.

The radiant heater and broiler illustrated in Figures 1 to 7 comprises a heater 1 and a frame 34. The main structural portion of the heater 1 is a housing 10 inside which is mounted a burner element 12. This burner element is preferably of the type described and claimed in my co-pending patent application Serial Number 214,-468 filed March 8, 1951, although any other suitable type of burner may be used, even any electrical heating element.

Where the heater is constructed for combustion of gas, the housing 10 is provided with a gas coupling 14. Surrounding the burner element 12 is a reflector flange 16, which serves to direct and concentrate the heat radiating from the burner element 12. The reflector flange 16 is preferably removable from the housing 10, and it is attached thereto by readily releasable means, for example by a mating nipple and socket connection 18 and 20 on one side of the housing 10 and a retaining screw 22 on the other side.

The housing 10 is provided with an insulated handle 24 by which it can be firmly grasped either for changing the position of the heater 10 on the frame 34 or for use of the heater as a radiating hand tool.

Adjacent the gas coupling 14, the housing 10 is provided with an air inlet 26 communicating with an injector 28 and therethrough with a mixing chamber 30 defined inside the housing 10. The gas issuing from the gas coupling 14 and passing through the air inlet 26 into the injector 28 causes air to flow therewith by ejector effect also through the air inlet 26 into the injector 28. From the mixing chamber 30, the combustible mixture of gas and air is fed through the burner element 12 toward the combustion surface thereof.

As seen in Figure 2, the reflector flange 16 is provided with vents 32 to permit the escape of burnt gases from the partly enclosed space defined by the flange 16 and the burner element 12.

The frame 34 on which the heater 1 is supported comprises a base portion 36 which is shown in contact with the floor in Figures 1 and 7, and in contact with a wall in Figure 6. Extending upwardly from the base portion 36, the frame 34 also includes a bracket portion 38, to which the heater 1 may be connected. In a preferred form as illustrated, the frame 34 is made up of a continuous tube the two ends of which are joined to closed form by a plug member 40 fitting snugly inside a socket 42 of the housing 10. As seen in Figure 4, the plug member 40 is preferably of rectangular cross-section, the socket 42 being designed as a jaw with a similar mating cross-section, whereby the heater 1 may be supported on the frame 34 in any one of the several positions indicated in Figures 1, 6, 7 and 8.

For use as a broiler, the frame 34 is provided with a drip pan 44, more clearly seen in the plan view of Figure 3, where it is supported on the base portion 36 of the frame 34. The drip pan 44 may be used in conjunction with a grille or any other suitable cooking utensil indicated conventionally in Figure 1.

In Figures 8 and 9, there is illustrated an alternative form of radiant heater and broiler according to the present invention. Many of the parts are similar to those of the embodiment of Figures 1 to 5, and they bear the same reference numerals.

In Figures 8 and 9, the housing 110, inside which is positioned a burner element 12, is formed with an integral reflector portion 116, instead of having a removable reflector flange. In view of the fact that cleaning of the inside of the housing 110 cannot be performed as readily as in the embodiment of Figures 1 to 5, the heater of Figures 8 and 9 is provided with a glass plate 146, which practically seals off toward the exterior the combustion surface of the burner element 12. The glass plate 146, which is of good heat-resisting properties, serves to support a cooking pot 148 or the like. In all other respects, the heater of Figures 8 and 9 resembles that of Figures 1 to 5, in that it comprises a gas coupling 14 leading through an air inlet 26 and an injector 28 to a mixing chamber on one side of the burner element 12. The flange portion 116 is provided with vents 32. The heater is supported on a frame 34 having a base portion 36 and a bracket portion 38.

What I claim is:

1. A multiple purpose radiant heater comprising a housing device having an open side, a heat radiating plate provided in said device and extending longitudinally thereof, said plate being arranged to radiate heat through the open side of said housing device, an open sided socket provided in said housing in fixed relation with said plate, said socket having angularly related walls and each of said walls extending transversely of said housing device, said walls being parallel to and symmetrical about a transversely extending axis and the walls adjacent the open side of the socket being parallel, said axis also being parallel to the plane of said radiating plate, a stand device for said housing, said stand device being provided with a plug device arranged on a horizontal axis and having pairs of parallel mating surfaces which are complementary to said parallel socket walls, said plug being receivable in said socket through the open side thereof in a plurality of angular positions of said socket relative to said axis, in each of which positions the upper surface of said plug is in supporting engagement with a wall of said socket, whereby said plate can be supported in one of a plurality of positions about said transverse axis and the heat from said plate can be radiated in a selected one of a plurality of defined directions.

2. A multiple purpose radiant heater comprising a housing device having an open side, a heat radiating plate provided in said device and extending longitudinally thereof, said plate being arranged to radiate heat through the open side of said housing device, an open sided socket provided in said housing in fixed relation with said plate, said socket having angularly related walls and each of said walls extending transversely of said housing device, said walls being parallel to and symmetrical about a transversely extending axis and the walls adjacent the open side of the socket being parallel, said axis also being parallel to the plane of said radiating plate, a stand device for said housing, said stand device being provided with a plug device arranged on a horizontal axis and having pairs of parallel mating surfaces which are complementary to said parallel socket walls, said stand device also being provided with a pair of laterally spaced flanges at opposite sides, respectively of said plug device, said plug being receivable in said socket through the open side thereof in a plurality of angular positions of said socket relative to said axis, in each of which positions the upper surface of said plug is in supporting engagement with a wall of said socket, whereby said plate can be supported in one of a plurality of positions about said transverse axis and the heat from said plate can be radiated in a selected one of a plurality of defined directions, said laterally spaced flanges preventing relative lateral movement of said plug and socket.

References Cited in the file of this patent

UNITED STATES PATENTS

| | | |
|---|---|---|
| 627,955 | Doss | June 27, 1899 |
| 1,528,948 | Pruden | Mar. 10, 1925 |
| 1,552,335 | Mottlau | Sept. 1, 1925 |
| 1,677,156 | Vaughn | July 17, 1928 |
| 1,838,653 | Bergman | Dec. 29, 1931 |
| 2,511,790 | Scofield | June 13, 1950 |
| 2,631,216 | Ames | Mar. 10, 1953 |
| 2,652,104 | Prent | Sept. 15, 1953 |